United States Patent
Duvinage et al.

(10) Patent No.: US 6,789,512 B2
(45) Date of Patent: Sep. 14, 2004

(54) METHOD FOR OPERATING AN INTERNAL COMBUSTION ENGINE, AND MOTOR VEHICLE

(75) Inventors: Frank Duvinage, Kirchheim/Teck (DE); Matthias Klingebiel, Weinstadt (DE); Ruediger Pfaff, Stuttgart (DE); Helko Sass, Tamm (DE); Lothar Welte, Geislingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/291,855

(22) Filed: Nov. 8, 2002

(65) Prior Publication Data

US 2003/0089319 A1 May 15, 2003

(30) Foreign Application Priority Data

Nov. 10, 2001 (DE) .......................... 101 55 339

(51) Int. Cl.⁷ ............................ F01P 7/14; F02M 25/07
(52) U.S. Cl. ................................ 123/41.05; 123/41.44; 123/568.12
(58) Field of Search ...................... 123/41.1, 41.12, 123/41.44, 41.31, 568.12, 568.21, 568.27, 550, 552, 41.05, 27 R, 563

(56) References Cited

U.S. PATENT DOCUMENTS

| | | | |
|---|---|---|---|
| 4,003,969 A | * 1/1977 | Robinson | 123/568.12 |
| 4,450,809 A | 5/1984 | Onaka et al. | 123/406.7 |
| 4,768,484 A | * 9/1988 | Scarselletta | 123/41.44 |
| 4,875,455 A | * 10/1989 | Hashimoto et al. | 123/568.14 |
| 5,353,763 A | 10/1994 | Schatz | 123/403 |
| 5,482,017 A | 1/1996 | Brehob et al. | 123/299 |
| 5,497,745 A | 3/1996 | Cullen et al. | 123/339.11 |
| 5,894,834 A | 4/1999 | Kim | 123/552 |
| 6,138,650 A | * 10/2000 | Bailey | 123/568.12 |
| 6,244,256 B1 | * 6/2001 | Wall et al. | 123/568.12 |

FOREIGN PATENT DOCUMENTS

| | | | | |
|---|---|---|---|---|
| DE | 197 28 351 | 1/1999 | | |
| EP | 0 499 207 | 8/1992 | | |
| EP | 0 924 416 | 6/1999 | | |
| JP | 59-23717 A | * 2/1984 | | 123/568.21 |
| JP | 8-93510 A | * 4/1996 | | 123/568.27 |
| JP | 20 00045843 | 8/1998 | | |
| JP | 11 132065 | 5/1999 | | |
| JP | 11 343 832 | 12/1999 | | |
| JP | 11 351027 | 12/1999 | | |

* cited by examiner

Primary Examiner—Willis R. Wolfe
(74) Attorney, Agent, or Firm—Klaus J. Bach

(57) ABSTRACT

In a method for operating an internal combustion engine, and a motor vehicle to be heated by the engine coolant, wherein the internal combustion engine has a cooling circuit, a heating mode can be established in which operating parameters of the internal combustion engine, while satisfying required output set values, are set for the maximum possible introduction of heat into the coolant and the exhaust gas in order to reach or hold a desired coolant temperature.

19 Claims, 1 Drawing Sheet

METHOD FOR OPERATING AN INTERNAL COMBUSTION ENGINE, AND MOTOR VEHICLE

BACKGROUND OF THE INVENTION

Figure 1:
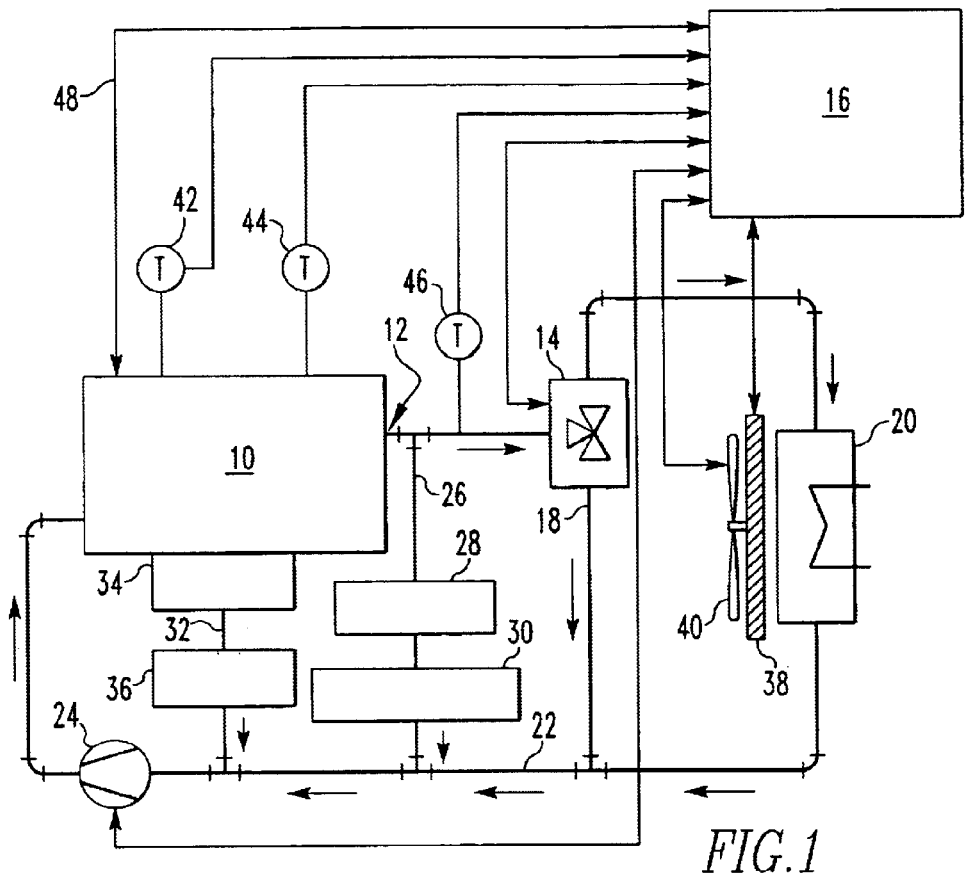

The invention relates to a method of operating an internal combustion engine which has a cooling circuit.

Modern internal combustion engines achieve high levels of thermodynamic efficiency. This results in new conflicts of objectives with regard to the heat budget of the engines. On the one hand, a rapid heat-up phase after the cold start is desirable, in order to reduce the friction by heating of the oil and to achieve optimum combustion as quickly as possible. However, implementing measures aimed at achieving high engine efficiency, delays the heating of the interior of the vehicle, since the coolant which flows through a heater is not heated sufficiently quickly, to achieve a satisfactory heating comfort. It is therefore necessary to provide secondary heating means.

German laid-open specification DE 197 28 351 A1 discloses a method for regulating heat in an internal combustion engine in which component temperatures and output characteristic variables of the internal combustion engine are monitored and are taken into account in the control of the coolant flow. Speed-controlled pumps, fans, electrically actuable valves and shutters can be used to implement the control.

It is the object of the present invention to provide a method of operating an internal combustion engine, and a motor vehicle, with which a satisfactory heating comfort is achieved without the need for secondary heating means.

SUMMARY OF THE INVENTION

In a method for operating an internal combustion engine, and a motor vehicle to be heated by the engine coolant, wherein the internal combustion engine has a cooling circuit, a heating mode can be established in which operating parameters of the internal combustion engine, while satisfying required output set values, are set for the maximum possible introduction of heat into the coolant and the exhaust gas in order to reach or hold a desired coolant temperature.

The coolant can be heated rapidly if, during the startup phase, the internal combustion engine is briefly switched to an operation with a thermodynamic efficiency, which is as bad as possible while still ensuring proper operation while the required output set values are satisfied. Consumption and exhaust-gas limit values can be maintained by switching to the heating mode only for a short period. Switching to the heating mode makes it possible to avoid the need for secondary heating means.

In a particular embodiment of the invention, in order to increase a combustion-chamber surface temperature during the startup phase, combustion is temporarily advanced with respect to the standard operation, while a maximum possible combustion-chamber pressure is maintained.

Advancing the combustion and/or maintaining the flow of coolant allows the combustion-chamber surface to be heated as quickly as possible. This is a required condition for operation with the worst possible thermodynamic efficiency, since misfiring can only be avoided with a high combustion-chamber surface temperature. Therefore, if the combustion-chamber surface temperature sensed is below a predetermined threshold value, above which the engine can be operated with a poor thermodynamic efficiency, the combustion timing is initially advanced or the flow of coolant is shut off or reduced in order to increase the combustion-chamber surface temperature. The point in time at which the general combustion takes place is considered to be the point in time when a fuel conversion rate of 50% of the charge has been reached.

In another embodiment of the invention, in the heating mode, the combustion is temporarily delayed with respect to standard operation, while predetermined limits for a combustion-chamber surface temperature are maintained.

Delaying the combustion results in a high exhaust-gas temperature and a poor thermodynamic efficiency of the internal combustion engine. It is ensured that predetermined limits for a combustion-chamber surface temperature are maintained, in order to avoid misfiring and to allow the internal combustion engine still to run smoothly. The high exhaust-gas temperature and the poor thermodynamic efficiency result in a high heat output and a maximum generation of heat in the internal combustion engine. As a result, the coolant can be heated rapidly in order to achieve a satisfactory heating comfort. In addition to a particular cold-start mode, these measures can also be carried out in partial-load mode in order to prevent the engine from cooling down. Such a cooling of the engine may result from the fact that cooling systems are generally designed for maximum demands, for example when driving uphill with a trailer in full-load operation at high ambient temperatures.

In still another embodiment of the invention the idling speed is increased in the heating mode as compared to standard operation, while the oil temperature and the coolant temperature are monitored.

This measure also contributes to the coolant temperature being increased to a level which ensures a satisfactory heating comfort.

In a further embodiment of the invention, in the heating mode, the flow of coolant through the internal combustion engine is blocked for a predetermined period of time after a cold start.

In this way, a combustion-chamber surface temperature can be rapidly increased to a level which allows the internal combustion engine to be operated with poor thermal efficiency as quickly as possible after a cold start. A blockage of the flow of coolant through the internal combustion engine is achieved, for example, by shutting down an electric cooling-water pump or by diverting the flow.

In a refinement of the invention, in heating mode, the flow of coolant through the internal combustion engine is controlled as a function of the combustion-chamber surface temperature and of the engine operating point.

In this way, it is possible to maintain a combustion-chamber surface temperature within a predetermined range.

In a further refinement of the invention, in the heating mode, an exhaust-gas re-circulation rate in an exhaust-gas re-circulation device of the internal combustion engine is set to a maximum possible value within predetermined limit values.

The limit values for the exhaust-gas re-circulation rate are determined by the smooth running of the engine, emission of pollutants and fuel consumption. A high exhaust-gas re-circulation rate results in a high thermal output from an exhaust-gas re-circulation heat exchanger. A high exhaust-gas re-circulation reduces the mass flow of cold fresh air, and leads to reduced heat losses on account of the reduced mass flow of exhaust gas being discharged. An exhaust-gas re-circulation rate is advantageously increased to such an extent that a cloudiness value of the exhaust gas remains just below the visibility limit.

In a further refinement of the invention, in order to increase the exhaust-gas re-circulation rate in the heating mode, the charging pressure of a supercharging device of the internal combustion engine is increased.

In this way, the amount of heat which can be removed from the engine and an exhaust-gas re-circulation cooler can further be increased. In addition, the dynamic properties of the vehicle can be improved, since the exhaust-gas temperatures are significantly higher than during standard operation, so that the charge pressure can be built up with less delay because of greater turbine output.

In a further refinement of the invention, in the heating mode the air flow through a charge-air cooler of a supercharging device of the internal combustion engine is set to zero (bypass).

This measure also contributes to the internal combustion engine or the coolant in the internal combustion engine being heated as quickly as possible.

Furthermore, in the heating mode, a radiator shutter is closed.

In still another refinement of the invention, in order to shift the combustion timing in the heating mode with respect to standard operation, a change is made to the injection quantities and/or injection times of a pre-injection, main injection and/or after-injection. Furthermore, in the heating mode, the injection pressure can be increased in order to increase the fuel injection quantity.

With a view to increasing the pressure and enlarging the injection quantity, it is for example possible to carry out a double, triple or multiple pre-injection, the individual injections being carried out at variable intervals both with respect to one another and with respect to the main injection quantity. This ultimately results in the center of combustion being shifted to an earlier time and possibly an increase in the combustion-chamber pressure up to the maximum permissible level.

In still a further refinement of the invention, there is a control means for controlling the coolant temperature of the internal combustion engine, the combustion-chamber surface temperature and/or the engine oil temperature.

The coolant temperature may be recorded, for example, at the coolant outlet of the internal combustion engine for control purposes. By monitoring and controlling the coolant temperature, the combustion-chamber surface temperature and/or the oil temperature, it is possible to achieve heating which is as fast as possible without any risk of overheating damage.

In a control means, the coolant temperature at the coolant outlet of the internal combustion engine, the combustion-chamber surface temperature and the oil temperature are prioritized in that order.

In this way, the coolant temperature has the highest priority, so that comfort-oriented control is achieved. The control means has at least one controller with a variable control characteristic.

It is, for example, possible to use a controller with what is known as an automated state unit, in which a control range is divided into a plurality of sub-ranges, each with different control characteristics, as a function of the control deviation and the interfering variables. It is also possible to use a PI controller, which, above a predetermined threshold value, operates as a P-controller.

The problem with which the invention is concerned is also solved by a motor vehicle having an internal combustion engine and heating installation for carrying out the method according to the invention, in which there are means for monitoring variables which are characteristic of a heating state of the internal combustion engine operating state and means for optionally setting a heating mode for the internal combustion engine. In the heating mode, operating parameters of the internal combustion engine, while satisfying required output values, are set for a maximum possible introduction of heat into the coolant and/or the exhaust gas. Advantageously, there is a controllable coolant pump for controlling the flow of coolant independently of the engine speed. It is also advantageous if an exhaust-gas recirculation heat exchanger is provided in the coolant circuit.

These measures enable operation of the internal combustion engine to be optimized with a view to an intelligent heating comfort management. On the one hand, operation for the quickest possible heating of the coolant is possible, and on the other hand so is an operation with the minimum possible consumption and emission of pollutants. A separate, controllable heating water pump is advantageous.

In a particular embodiment of the invention, the exhaust-gas recirculation heat exchanger and a heater are connected in series in the coolant circuit. An arrangement of this type is particularly effective, since in the exhaust-gas recirculation heat exchanger the coolant is additionally heated and, immediately thereafter, is cooled again in the heater. In this way, the coolant can only cool down to an insignificant extent between the exhaust-gas re-circulation heat exchanger and the heater. As a result, with the abovementioned arrangement, the coolant reaches the highest possible temperature when it enters the heater.

Preferably, a bypass line for bypassing the coolant radiator and a mixing valve, which can be controlled by means of a central control unit, for setting the flow of coolant through the bypass line and the coolant radiator are provided.

As a result, means for effectively controlling the flow of coolant as a function of engine operating parameters are provided. It is advantageously possible to provide a cylinder head and/or engine block through which the coolant flows transversely and an engine enclosure which can be tightly sealed.

The invention will become more readily apparent from the following description of preferred embodiments thereof in conjunction with the drawings:

BREIF DESCRIPTION OF THE DRAWINGS

Figure 2:
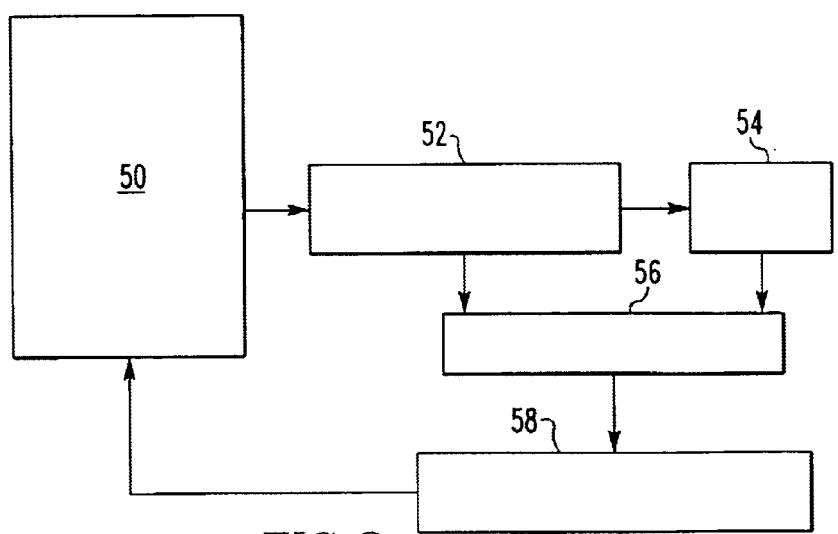

FIG. 1 depicts diagrammatically an internal combustion engine for a motor vehicle according to the invention and for carrying out the method according to the invention, and FIG. 2 diagrammatically depicts the control arrangement in accordance with the method according to the invention.

DESCRIPTION OF PREFERRED EMBODIMENTS

The diagrammatic illustration presented in FIG. 1 shows an internal combustion engine 10 as provided in a motor vehicle for carrying out the method according to the invention. The internal combustion engine 10 has a cooling circuit in which a coolant is circulating. The direction of flow of the coolant in the cooling circuit is indicated by an arrow at each of various locations. Starting at an outlet port 12 of the internal combustion engine 10, coolant passes to a controllable mixing valve 14, which is preferably a valve. The mixing valve 14 is actuated by means of a central control unit 16. The transmission of data from the control unit 16 to the control valve 14 and vice versa is indicated by a double arrow given in dashed lines. The flow of coolant coming from the internal combustion engine 10 is directed by the control valve 14 to a bypass line 18 or to a heat exchanger 20.

Downstream of the heat exchanger 20, the bypass line 18 is connected to the main line 22, which leads to a coolant pump 24. The coolant pump 24 is operated electrically and can be actuated by means of pulse width-modulated signals (PWM) from the control unit 16. An exchange of data between the coolant pump 24 and the control unit 16 is indicated by a dashed double-arrow line. The coolant pump 24 pumps the coolant back into the internal combustion engine 10.

A line 26 branches off from the coolant outlet 12 upstream of the control valve 14 and successively extends through an exhaust-gas re-circulation cooler 28 and a heater 30 and then joins the main line 22, which leads to the coolant pump 24.

A further coolant line 32 branches off directly from the internal combustion engine 10 and leads via an oil-water heat exchanger 34 and a charge-air heat exchanger 36 back to the main line 22, which leads to the coolant pump 24.

The arrangement of the components may be modified in the various exemplary embodiments. By way of example, as an alternative to the arrangement illustrated, the oil-water heat exchanger may be connected downstream of the heater. Alternatively, an additional oil-water heat exchanger may be connected downstream of the heater 30.

The radiator 20 is provided with a radiator shutter 38 and an electric fan 40, both of which can be actuated by means of the control unit 16. The internal combustion engine 10 is arranged in a tightly sealed engine enclosure or engine compartment, so that there can be no heat losses as a result of air flow or the like.

The central control unit 16 receives input signals from a component temperature sensor, in the form of a combustion-chamber surface temperature sensor 42, which can be used to determine the combustion-chamber surface temperature in the internal combustion engine 10 and which transmits this temperature to the control unit 16. An oil temperature of the internal combustion engine 10 is monitored by means of an oil temperature sensor 44 and transmitted to the control unit 16. Furthermore, the coolant temperatures downstream of the coolant outlet 12 and upstream of the bypass valve 14 are sensed by means of a coolant temperature sensor 46 and likewise transmitted to the control unit 16. As an alternative to the sensor values, it is also possible to use calculated variables and/or empirical values.

The ignition timing, the fuel injection quantity and the fuel injection timing of the internal combustion engine 10 can be changed by means of the control unit 16. The internal combustion engine 10 provides the control unit 16 with actual values. This exchange of data between the control unit 16 and the internal combustion engine 10 is indicated by a dashed double arrow 48.

The process according to the invention is intended to provide an intelligent heating-comfort management system which satisfies the demand for spark-ignition and diesel engines as a function of the prevailing operating and ambient conditions without additional, secondary heating means. For this purpose, in a heating mode the internal combustion engine 10 is used as a "burner" for heating the interior of the vehicle. This means that the internal combustion engine 10 is from time to time operated with the worst possible thermodynamic efficiency, in order to obtain the maximum possible heat input into the exhaust gas and the engine and also into the coolant. To achieve this, the main combustion is shifted to extremely late.

A required condition for such a shift of the combustion to a late timing is a high temperature of the components which delimit the combustion chamber, since otherwise misfiring will impair the driveability of the vehicle. Consequently, the combustion-chamber surface temperature has to be monitored, and, when a combustion-chamber surface temperature is below a critical level, it is initially necessary to take measures for rapidly heating the components which delimit the combustion chamber.

To heat the combustion-chamber surface as quickly as possible, the combustion is shifted to an early timing. For this purpose, the fuel injection quantity is increased by increasing the rail pressure, for example by means of the control unit 16, and at the same time the number of pre-injections is increased. A limit in this connection is formed by the maximum permissible combustion-chamber pressure which must not be exceeded.

Depending on the combustion-chamber surface temperature, which is sensed by means of the combustion-chamber surface temperature sensor 42 and transmitted to the control unit 16, the combustion timing is continuously shifted to a later position, in order to force an exhaust-gas temperature as high as possible and to achieve a maximum possible increase in the introduction of heat into the coolant. A shift in the average combustion timing of this nature is achieved, for example, by means of double or triple after-injections, possibly in combination with an increase in the injection quantity by an increased rail pressure and/or by extending the injection time. The center of or the average combustion is shifted to late to such an extent that the propulsion required by the driver, the load demand, is provided with the worst possible effective efficiency, and therefore the maximum possible energy is available for heating the interior of the vehicle.

This so-called heating mode is only established from time to time, so that, when a desired coolant temperature has been reached, it is possible to switch back to an operation which is optimized in terms of consumption and emission of pollutants. It is also necessary to switch from the heating mode to standard operation if there is a high demand for power during a cold-starting phase, for example as a result of full-load acceleration. In such cases, starting from the heating mode, the combustion timing has to be shifted back to early as quickly as possible, in order to be able to satisfy the power or torque demands of the driver.

The method according to the invention provides further measures for providing an intelligent heating comfort management for internal combustion engines. For example, the idling speed of the internal combustion engine 10 is increased by the control unit 16 as a function of the oil temperature, which is recorded by the oil temperature sensor 44, and as a function of the coolant temperature, which is recorded by the coolant temperature sensor 46.

Furthermore, the cooling water is not re-circulated during the first seconds of the cold-starting phase. For this purpose, the control unit 16 switches off the coolant pump 24 and/or closes the mixing valve 14. This period may last for up to two minutes. Then, as the cold-starting phase progresses, the flow of cooling water is controlled by means of the control valve 14 and the coolant pump 24 as a function of the combustion-chamber surface temperature, which is sensed by the combustion-chamber surface temperature sensor 42, and the current combustion timing.

Furthermore, an exhaust-gas re-circulation rate is set to a maximum possible level which is just below visible cloudiness of the exhaust gas, in order for the maximum possible quantity of heat to be introduced into the coolant in the line 26 via the exhaust-gas re-circulation heat exchanger 28. Depending on the current engine operating point, it is also possible for the maximum possible exhaust-gas re-circulation rate to be increased further by increasing the charging pressure of a supercharger of the internal combustion engine.

During the heating mode, the control unit 16 holds the radiator shutter 38 closed. In conjunction with the sealing of the engine compartment which has already been mentioned, in this way, heat losses are kept as low as possible.

The control unit 16 is used to control the coolant temperature at the coolant outlet 12 of the internal combustion engine 10, the combustion-chamber surface temperature of the internal combustion engine 10 and the oil temperature. The actual values for the coolant temperature at the coolant outlet 12 are sensed by means of the coolant temperature sensor 46. The combustion-chamber surface temperature is recorded by means of the combustion-chamber surface temperature sensor 42, and the oil temperature is monitored by means of the oil temperature sensor 44. All these values are transmitted to the control unit 16. The set values for the three control variables coolant temperature at the outlet, combustion-chamber surface temperature and oil temperature are predetermined on the basis of characteristic diagrams. For example, the control unit 16 includes a basic characteristic diagram for the coolant temperature at the engine outlet as a function of the engine load and the driving speed. The control variable coolant temperature at the engine outlet is used primarily to ensure that the cooling of the engine meets requirements and also to decisively influence the heating comfort in the interior of the vehicle.

A characteristic diagram comprising set values for the combustion-chamber surface temperature as a function of the engine speed and injection quantity is also stored in the control unit 16. This guide variable is absolutely imperative for controlling the temperature of the combustion-chamber surface in order to provide for targeted heating of the combustion-chamber surfaces after a cold start. Furthermore, monitoring of the combustion-chamber surface temperature has proven to be the most reliable and fastest means for indicating a cooling system malfunction.

The oil temperature is predetermined by means of the control unit 16 as the third guide variable. In this way, in combination with the monitoring of the coolant outlet temperature and the combustion-chamber surface temperature in particular during partial-load operation, an improved heating comfort can be achieved. Monitoring the oil temperature also assists in effectively protecting the engine under a high load and at a high speed.

The control on the basis of the guide variables described using the control unit 16 is diagrammatically depicted in FIG. 2. Control differences and limit values for operating parameters of the internal combustion engine are determined in a functional block 50. Control variables are the coolant temperature at the coolant outlet, the combustion-chamber surface temperature and the oil temperature with a prioritization which assigns the highest priority to the coolant temperature at the outlet, the second highest priority to the combustion-chamber surface temperature and the lowest priority to the oil temperature. In the functional block 50, the coolant temperature monitored at the outlet, the combustion-chamber surface temperature for example as a web temperature and the oil temperature for example in the oil sump, are processed as input variables. These input variables are used to determine a prevailing control value difference. Further input variables in the functional block 50 are used, for example, to determine operating state-dependent limit values for operating parameters of the internal combustion engine and to determine a control characteristic which is suitable for the current operating state of the internal combustion engine. Examples of such further input variables are the engine speed, the vehicle driving speed, the fuel injection quantity, the outside-air temperature and the refrigerant pressure in an air-conditioning system of the motor vehicle. The input variable refrigerant pressure is used to influence the actuation of the fan 40 (FIG. 1).

Control value differences and limit values are then available in block 52. These values are transmitted to an automated state unit 54, which selects a suitable control characteristic as a function of the magnitude of the control value difference and any limit values which have been exceeded. By way of example, a control range can be divided into four quadrants, in each of which a different control characteristic is used.

The automated state unit 54 transmits a suitable controller setting to the controller 56. The control value differences are also transmitted from the block 52 to the controller 56, and the controller 56 then provides actuating signals which are formed by the block 58. Examples of actuating signals are pulse width-modulated signals (PWM) for actuating the electric coolant pump 24 PWM signals for actuating the mixing valve 14, which is designed as a rotary spool valve, PWM signals for the fan 40 and the radiator shutter 38. Furthermore, the controller 56 provides signals for setting the actuating signals injection quantity and injection timing. In the case of a spark-ignition engine, the controller 56 can furthermore emit signals for changing the ignition timing. Injection quantity and injection time are changed, for example, by increasing the rail pressure, changing the injection duration and changing the number of pre-injections, main injections and after-injections.

Feedback of actual values to the functional block 50, i.e. of actual values which are monitored by means of the sensors 42, 44, 46 and if appropriate further sensors, is symbolized by a connection between the block 58 and the functional block 50.

What is claimed is:

1. A method for operating an internal combustion engine which has a coolant circuit and exhaust gas re-circulation, during warm-up by switching engine operation from a normal mode to a heating mode for rapidly reaching or holding a desired coolant temperature, wherein operating parameters of the internal combustion engine, while satisfying required output values, are set for the maximum possible introduction of heat into the coolant and/or the exhaust gas, said method comprising the step of setting an exhaust-gas re-circulation rate in an exhaust-gas re-circulation device of the internal combustion engine to a maximum possible value while maintaining predetermined limit values.

2. A method according to claim 1, wherein, in said heating mode, in order to increase a combustion-chamber surface temperature, combustion is temporally advanced with respect to the combustion in standard operation, while a maximum allowable combustion-chamber pressure is maintained.

3. A method according to claim 1, wherein, in said heating mode, the combustion is delayed with respect to the combustion during normal engine operation, while predetermined limits for a combustion-chamber surface temperature are maintained.

4. A method according to claim 1, wherein, in said heating mode, the engine idling speed is increased compared to standard operation, while the oil temperature and a the coolant temperature are monitored.

5. A method according to claim 1, wherein, in the heating mode, flow of coolant through the internal combustion engine is set to zero for a predetermined period of time after engine startup.

6. A method according to claim 1, wherein, in the heating mode, the coolant flow through the internal combustion engine is controlled as a function of the combustion-chamber surface temperature and the engine operating point.

7. A method according to claim 1, wherein, in the heating mode, a radiator shutter disposed in front of the radiator is closed.

8. A method according to claim 1, wherein, in said heating mode, an engine charging pressure of a supercharging device of the internal combustion engine is increased to increase the exhaust-gas re-circulation rate.

9. A method according to claim 8, wherein, in the heating mode, an air flow through a charge-air cooler of said supercharging device of the internal combustion engine is set to zero.

10. A method according to claim 1, wherein, in the heating mode, in order to shift the average combustion time with respect to standard operation, the injection quantities and/or injection times of a pre-injection, main injection and/or after-injection are changed.

11. A method according to claim 10, wherein, in the heating mode, at least one of the fuel injection pressure and the injection duration are increased in order to increase a fuel injection quantity.

12. A method according to claim 1, wherein with a control means for controlling the coolant temperature of the internal combustion engine, the combustion-chamber surface temperature and the oil temperature are monitored for maintaining them below a limit value.

13. A method according to claim 12, wherein in the control means, the coolant temperature at the coolant outlet of the internal combustion engine, the combustion-chamber surface temperature and the oil temperature are prioritized in that order.

14. A method according to claim 13, wherein the control means has at least one controller with a variable control characteristic.

15. A motor vehicle having an internal combustion engine and a heater installation for rapidly heating the interior of the vehicle, comprising means for monitoring variables which are characteristic of a heating state of the internal combustion engine and means for setting a heating mode of the internal combustion engine, in which operating parameters of the internal combustion engine, while satisfying required output set values, are set during a starting phase of the engine for a maximum possible introduction of heat into the coolant and the exhaust gas.

16. A motor vehicle according to claim 15, comprising an independently controllable coolant pump for controlling the flow of coolant independently of the engine speed.

17. A motor vehicle according to claim 15, wherein a bypass line is provided for bypassing a coolant radiator including a mixing valve, which can be controlled by means of a central control unit for setting the respective flows of coolant through the bypass line and the cooling system radiator.

18. A motor vehicle according to claim 15, wherein an exhaust-gas re-circulation cooler is provided in the cooling circuit.

19. A motor vehicle according to claim 18, wherein the exhaust-gas re-circulation and a heater are connected in a series arrangement in the cooling circuit.

* * * * *